(12) United States Patent
Makris et al.

(10) Patent No.: US 9,226,109 B2
(45) Date of Patent: Dec. 29, 2015

(54) SYSTEM AND METHOD FOR ANONYMOUS DELIVERY OF GEOGRAPHICALLY SPECIFIC RICH MEDIA INFORMATION

(71) Applicant: Ping4 Inc., Nashua, NH (US)

(72) Inventors: Anastasios Makris, Windham, NH (US); Rindress MacDonald, Hollis, NH (US); Dave Benvenuti, Boston, MA (US); Kevin Menard, Holliston, MA (US); Paul Kingston, Nashua, NH (US); Mark Sexton, Merrimack, NH (US); Brannen Huske, Nashua, NH (US); Michael Amaral, Hudson, NH (US)

(73) Assignee: PING4 Inc., Nashua, NH (US)

( * ) Notice: Subject to any disclaimer, the term of this patent is extended or adjusted under 35 U.S.C. 154(b) by 0 days.

(21) Appl. No.: 14/145,391

(22) Filed: Dec. 31, 2013

(65) Prior Publication Data
US 2015/0189473 A1    Jul. 2, 2015

(51) Int. Cl.
| | | |
|---|---|---|
| H04W 4/02 | (2009.01) | |
| H04W 64/00 | (2009.01) | |
| H04H 20/61 | (2008.01) | |
| H04H 20/57 | (2008.01) | |
| H04H 20/59 | (2008.01) | |
| H04H 60/51 | (2008.01) | |

(52) U.S. Cl.
CPC ............ *H04W 4/025* (2013.01); *H04W 64/003* (2013.01); *H04H 20/57* (2013.01); *H04H 20/59* (2013.01); *H04H 20/61* (2013.01); *H04H 60/51* (2013.01)

(58) Field of Classification Search
CPC ... H04L 20/08657; H04L 51/04; H04L 67/16; H04L 65/60; H04W 4/22; H04N 5/23203; G06F 3/016
USPC .......................... 455/456.3, 415, 416; 715/738
See application file for complete search history.

(56) References Cited

U.S. PATENT DOCUMENTS

| | | | |
|---|---|---|---|
| 6,370,629 B1 | 4/2002 | Hastings et al. | |
| 6,745,021 B1 | 6/2004 | Stevens | |
| 8,457,612 B1 | 6/2013 | Daniell | |
| 8,478,225 B2 | 7/2013 | Sennett et al. | |
| 2008/0162637 A1 | 7/2008 | Adamczyk et al. | |
| 2009/0287401 A1 | 11/2009 | Levine et al. | |
| 2012/0190386 A1 | 7/2012 | Anderson | |
| 2013/0019284 A1* | 1/2013 | Pacyga et al. | 726/4 |
| 2013/0065569 A1* | 3/2013 | Leipzig et al. | 455/416 |
| 2013/0073387 A1 | 3/2013 | Heath | |
| 2013/0318359 A1 | 11/2013 | Morris et al. | |

OTHER PUBLICATIONS

International Search Report and Written Opinion mailed Apr. 22, 2015, regarding PCT/US2014/072327.

* cited by examiner

*Primary Examiner* — Phuoc H Doan
(74) *Attorney, Agent, or Firm* — Arent Fox LLP

(57) ABSTRACT

An alert system and method with a web based alert server configured with an alert creation portal allowing a customer to generate and store alert information specific to a location. An alert application for mobile devices is configured to upload to the alert server an anonymous token and mobile device location information. The alert server searches for anonymous tokens for mobile devices located within the alert location and serves stored alert information to the alert applications of the mobile devices located within the alert location.

12 Claims, 8 Drawing Sheets

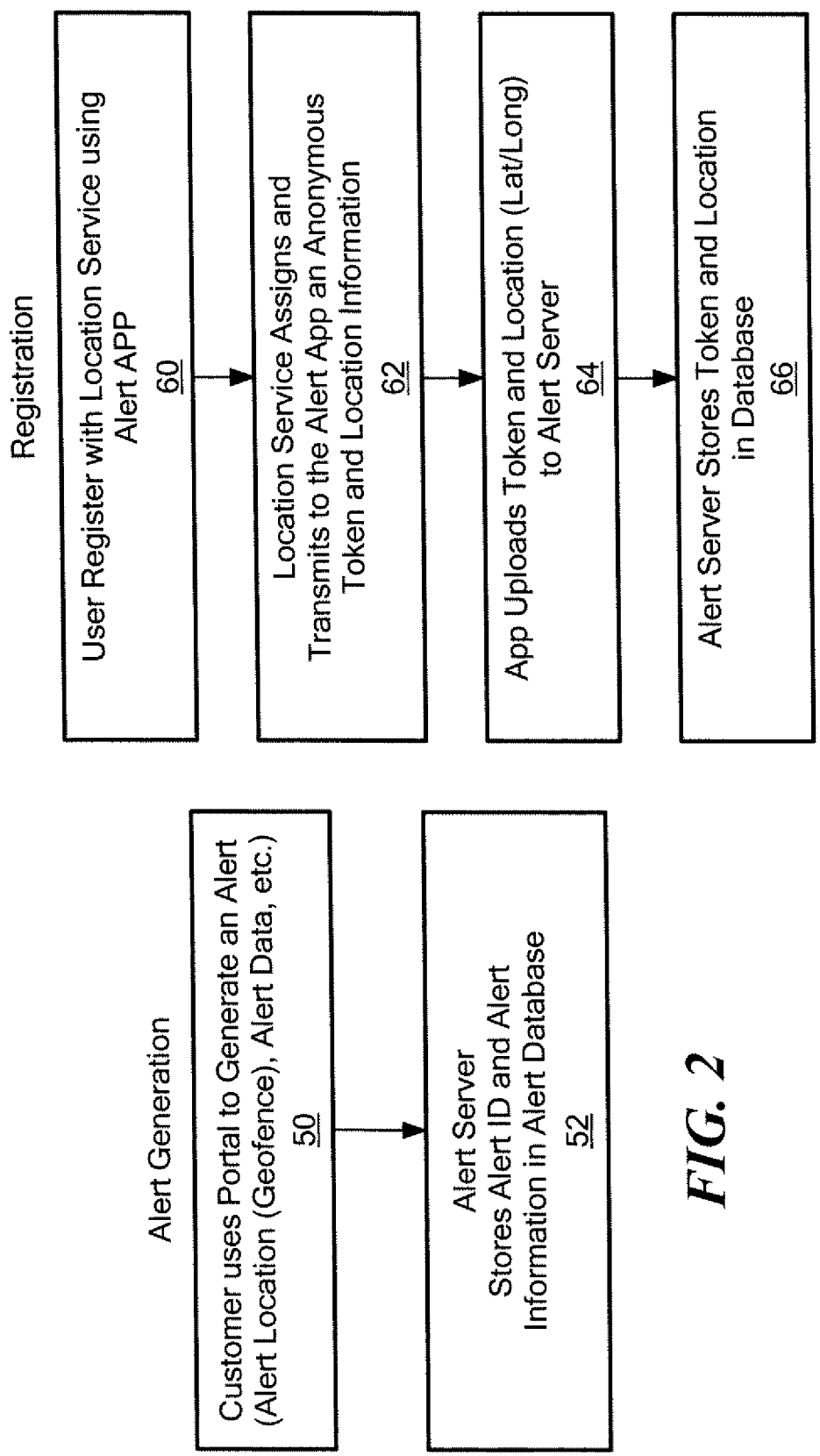

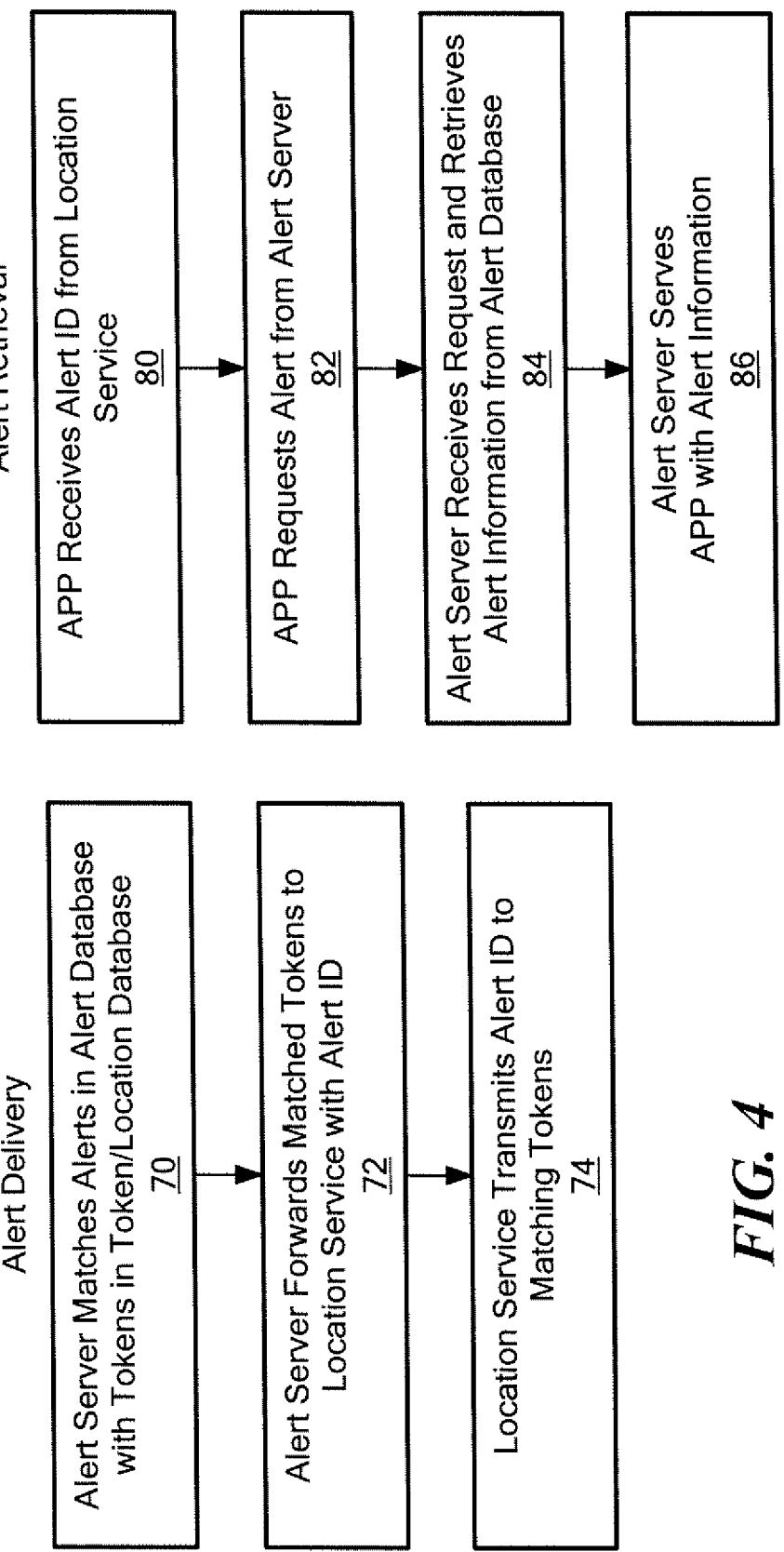

SYSTEM AND METHOD FOR ANONYMOUS DELIVERY OF GEOGRAPHICALLY SPECIFIC RICH MEDIA INFORMATION

FIELD OF THE INVENTION

The subject line invention relates to alerts delivered wirelessly to mobile devices such as smart phones.

BACKGROUND OF THE INVENTION

Alerts such as weather alerts are provided to cell phone users using the government's wireless emergency alert system. An alert is generated and forwarded via cell phone carriers to a specific cell tower or towers in the alert area. All cell phones in communication with those towers then receive the alert. See, for example, the IPAWS WEA service.

Other alert systems are described in U.S. Pat. Nos. 6,745, 021 and 8,478,225 incorporated herein by this reference. Generally, information about the cell phone and/or cell phone user are known and stored such as the cell phone IP address, cell phone number, or the like (i.e., private data).

Various entities may wish to provide different kinds of alerts via an alert service such as the "Ping4" service (www.ping4.com). Example may include weather alerts, Amber alerts, traffic alerts, and the like as well as commercial entities wishing to offer users coupons, discounts, and the like via commercial alerts.

The users, however, may avoid registering with such services because of privacy concerns. That is, the user may not wish to divulge private data to the services delivering the alerts and/or the entity generating the alerts. Moreover, the service provider, were it in possession of such private data, would have to incur the costs associated with protecting the private data in accordance with applicable international, federal, and state laws.

As the cell phone market transitions from feature phones to smart phones, smart phones are able to connect to the interne either over the cell phone network or by using Wifi connectivity. Smart phones can run small software applications known as apps and, in addition, can be aware of the phone location through the use of the GPS chip, cell phone tower triangulation, or a WiFi network location mapping.

Smart phones can receive e-mails containing rich media information, but the email is not specific to the location where the phone is located.

SUMMARY OF THE INVENTION

Provided is a web based alert service and smart phone app that is capable of delivering rich media information to a smart phone or other mobile device such as a tablet in a very specific location such as a particular building or particular block of a city or stretch of road without ever knowing the phone number, phone unique device identifier, e-mail address, IP address, or other private information identifying the owner of the phone. Provided to the user mobile device application are alerts of various types including public safety warnings, store coupons, and the like. Various entities can use the alert server portal to generate alerts specific to a given location and the alert server serves such generated alerts to the appropriate user mobile devices located at the alert location. The alert server is capable of sending images, sounds, and links to web pages with video.

In one example, the alert server obtains the mobile device location from the mobile device itself on a frequent periodic basis. Mobile devices that enter the alert area are provided with the alert from the server. Individual user mobile devices are notified of alerts on a device-by-device basis without ever knowing the user mobile device IP address or other private information. Alerts can be tailored to be provided to user mobile devices present in a single building or even in different areas of a single building.

Featured is an alert system comprising a web based alert server configured with an alert creation portal allowing a customer to generate and store an alert specific to a location. An alert application for a mobile device is configured to upload to the alert server an anonymous token and mobile device location information. The alert server searches for anonymous tokens for mobile devices located within the alert location and serves a stored alert to the alert applications of mobile devices located within the alert location.

In one version, the alert application is configured to register with a location service which assigns the anonymous token to the alert application of each mobile device. The alert application may be configured to receive location information and to upload the anonymous token and mobile device location information to the alert server.

The alert server may be configured to forward the anonymous tokens for mobile devices located within the alert location and an alert identifier to the location service which then transmits an alert identifier to the alert applications of the corresponding mobile devices. Now, the alert application can allow a user of the mobile device to request alert information from the alert server. The alert server is configured, in response to such a request, to serve the alert application with alert information corresponding to the alert identifier and any other alerts active for the location of the device. Typically, the alert server is configured to populate, update, and search a first data base including anonymous tokens corresponding to mobile device location information and to populate, update, and search an alert data base including alert identifiers corresponding to alert information.

One alert system features a web based alert server, a location service configured to assign an anonymous token for each mobile device and a downloadable alert application for each mobile device configured to transmit the anonymous token and location information to the web based alert server. The web based alert server is configured with an alert creation portal allowing a customer to generate and store an alert specific to an alert location, to keep track of the location of mobile devices represented by anonymous tokens, to search for anonymous tokens representing mobile devices located within an alert location, and to serve a stored alert to the alert applications of mobile devices located within the alert location.

Also featured is an alert method comprising allowing a customer to generate and store alert information specific to an alert location, keeping track of the location of mobile devices each represented by an anonymous token, searching for anonymous tokens representing mobile devices located within a stored alert location, and serving stored alert information to mobile devices located within the alert location.

The method may further include the step of assigning an anonymous token to each mobile device. Serving a stored alert may include forwarding anonymous tokens representing mobile devices located within the alert location and a corresponding alert identifier to a location service which transmits the alert identifier to an alert application of the mobile devices. The method may further include receiving a request for an alert information from a mobile device and serving alert information corresponding to the alert identifier and any other alerts active for the device location.

One alert method includes allowing a customer to generate and store alert information specific to an alert location represented by an alert identifier, downloading an alert application to a user mobile device, assigning to the mobile device an anonymous token, transmitting the anonymous token and mobile device location information to an alert server, searching for anonymous tokens for mobile devices located within the alert location, serving an alert identifier to the location service along with the anonymous tokens for mobile devices located within the alert location, and forwarding the alert identifier to the alert applications of user mobile devices having a matching anonymous token.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features, and advantages will occur to those skilled in the art from the following description of a preferred embodiment and the accompanying drawings, in which:

FIG. 2 is a flow chart depicting the primary steps associated with generating an alert via the alert creation portal shown in FIG. 1;

FIG. 3 is a flow chart depicting the primary steps associated with the registration of a user mobile device in order to receive alert information from the alert server of FIG. 1;

FIG. 4 is a flow chart depicting the primary steps associated with delivering an alert identifier to various user mobile devices via a location service in accordance with one example of the invention;

FIG. 5 is a flow chart depicting the primary steps associated with the alert application of FIG. 1 on a user mobile device retrieving alert information from the alert server;

DETAILED DESCRIPTION OF THE INVENTION

Figure 1:
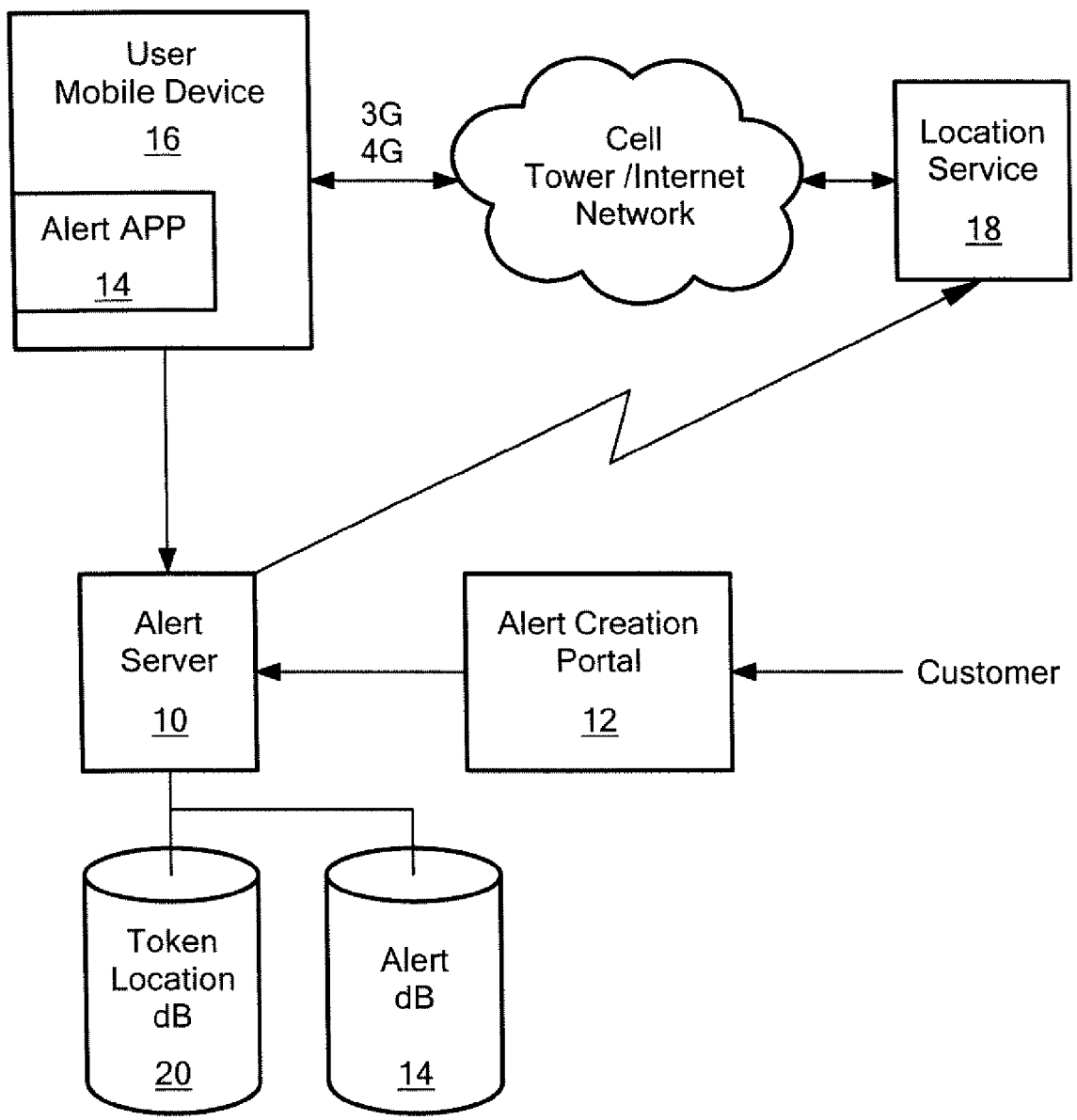
FIG. 1 is a block diagram showing an example of the primary components of an alert system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows the primary components associated with an exemplary alert system in accordance with the invention. Web based alert server 10 has alert creation portal 12 allowing a customer to generate an alert specific to a location which may be a geofenced area, step 50, FIG. 2. Alerts so generated include weather alerts, traffic alerts, alerts regarding discount for products or services, and the like. Typically, the customer will enter, on a web page served to the customer, the details of the alert and the geofence for the alert. Alert server 10, FIG. 1 stores the alert information in alert database 14, step 52. Alert server 10 also typically assigns each alert an alert identifier also stored in database 14 to correspond to the customer entered alert information.

An alert application can also be downloaded from an app store and/or alert server 10, FIG. 1 to user mobile device 14. The alert application includes instructions directing and enabling the mobile device user to register with location service 18, step 60, FIG. 3. In some examples, the mobile device will have already registered with the location service.

Mobile device 16 is typically a smart phone, computer tablet, or the like and communicates with location service 18 via cell towers and/or the internet. An example of a location service is Google Cloud Messaging. See also U.S. Pat. No. 6,370,620 incorporated herein by this reference.

It is the location service 18, FIG. 1 then assigns and transmits to application 14 an anonymous token, step 62, FIG. 2. The anonymous token may be linked to the IP address of the mobile device 16, FIG. 1, the cellular telephone number of the mobile device, or the like. But, alert server 10 does not receive or process such private information.

Application 14, FIG. 1 then uploads its unique token and location information to alert server 10, step 64, FIG. 3.

Alert server 10, FIG. 1 then stores the token and location information in token/location database 20, step 66, FIG. 3. Location information may be updated periodically and alert server 10 may store new location information in database 20 for the devices represented by their secure anonymous tokens. Location information may be based on cell tower triangulation techniques, GPS data (for devices equipped with a GPS chip), and the like. Alert server 10 is configured to populate, update, and search an alert database including alert identifiers corresponding to alert information. In general, alert server 10 keeps track of the current location of users but only by knowing the location of the anonymous tokens. And, alert server 10 knows which alerts apply to which locations. So, in step 70, FIG. 4, alerts server 10, FIG. 1 matches alerts in alert database 14 with tokens and locations in token/location database 20.

An example alert may be a tornado warning in the western section of Worcester County, Massachusetts, USA. Token/location database 20, FIG. 1 may have twelve entries for tokens within that location. Another example of an alert may be a 50% off coffee coupon at a coffee shop in a mall located in a town. The geofence for the coffee shop for this alert may be a radius of 50 yards around the coffee shop. Token/location database 20 may have two entries for tokens within that geofenced area.

After matching, alert server 10, FIG. 1 forwards the matched tokens to location service 18 along with an alert identifier generated for the alert, step 72, FIG. 4. Location service 18, FIG. 1 then transmits the appropriate alert identifier to the alert application of user devices who have been assigned these tokens, step 74, FIG. 4.

In step 80, FIG. 5, application 14, FIG. 1 receives such an alert identifier from location service 18. In the examples above, twelve users received an alert identifier corresponding to the tornado warning and two users received a different alert identifier corresponding to the 50% off coffee coupon.

In step 82, FIG. 5, application 14, FIG. 1 can be used to request the full alert information from alert server 10. In some cases, users may not desire to be bothered by specific alerts. In other cases, a user may wish to receive additional information concerning an alert.

If the user requests the alert information, alert server 10, FIG. 1 receives the alert identifier, retrieves the alert information from alert database 14, step 84, FIG. 5 corresponding to the alert identifier, and, in step 86, alert server 10, FIG. 1 serves application 14 with the alert information along with all other alerts active for the device location.

Note that at no time did alert server 10, FIG. 1 receive or use private information from the user (e.g., cellular telephone numbers, IP addresses, or the like). Instead, all alert server 10 uses and stores are anonymous tokens. Thus, the alert system described herein can be marketed to users as secure, private, or the like. Users who desire privacy may more readily utilize such a service. And, the alert service provider need not incur the cost associated with protecting private data in accordance with state or national laws or regulations.

The alert server 10 and its portal 12 may reside on one or more servers, and/or may be distributed amongst various physical locations and/or computers. Typically, alert server 10 is configured with computer program instructions for carrying out the functionality described herein. Alert application 14 is typically also executable computer code run by one or more processors of mobile device 16.

Figure 6:
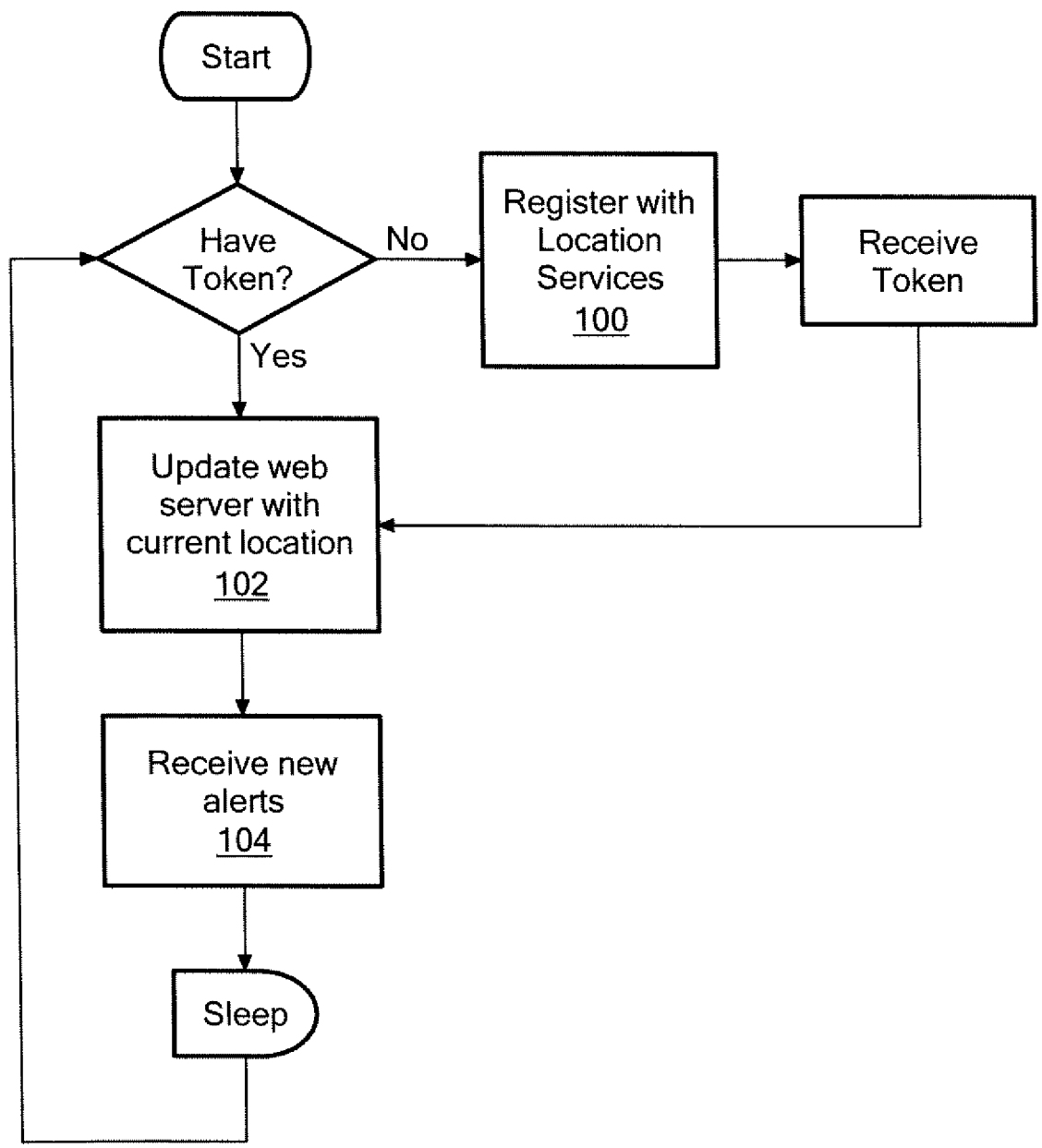
FIG. 6 is a flow chart depicting the primary steps associated with the alert application algorithm for registering with a location service, updating the alert server with current location information, and receiving new alerts.

FIG. 6 depicts an algorithm associated with application 14, FIG. 1, in one example. In step 100, registration is effected with the location service via application code, examples of which are reproduced here for an Android device:

```
public static void regregisterApp(Context context){
    try {
        if (Globals.getRegistrationId(context.getApplicationContext( )) == null) {
            log.info("MainActivity:RegisterC2DMAsync - registering with Google");
            startRegisterC2DM(context);
        } else {
            // At this point we are initialized
            ...
        }
    } catch (Exception e) {
        log.error("Exception trying to register with Google", e);
    }
}
public static void startRegisterC2DM(Context context) {
    if (Globals.getRegistrationId(context.getApplicationContext( )) == null) {
        // Make sure we register with the Google server
        log.info("Start registration process for C2DM");
        Intent intent = new Intent("com.google.android.c2dm.intent.REGISTER");
        intent.putExtra("app", PendingIntent.getBroadcast(context.getApplicationContext( ), 0, new Intent( ), 0));
        intent.putExtra("sender", "Ping4Alerts@gmail.com");
        context.getApplicationContext( ).startService(intent);
    }
}
public void onReceive(Context context, Intent intent) {
    String action = intent.getAction( );
    if ("com.google.android.c2dm.intent.REGISTRATION".equals(action)) {
        final String registrationId = intent.getStringExtra("registration_id");
        String error = intent.getStringExtra("error");
        if ("ACCOUNT_MISSING".equalsIgnoreCase(error)) {
            log.error("Error getting registration ID. (ACCOUNT_MISSING)");
            // Ask the user to create an account so we can use the google services
            Intent i = new Intent(Settings.ACTION_ADD_ACCOUNT);
            i.putExtra(Settings.EXTRA_AUTHORITIES, new String[ ]{"gmail-ls"});
            i.addFlags(Intent.FLAG_ACTIVITY_NEW_TASK);
            context.startActivity(i);
        } else {
            try {
                if (registrationId != null) {
                    // Also save it in the preference to be able to show retrieve later
                    Globals.saveRegistrationId(context.getApplicationContext( ), registrationId);
                    new Globals.SendServer( ).execute(context);
                }
            } catch (Exception e) {
                log.error("Exception handling C2DM Registration:", e);
            }
        }
    }
}
```

For an iPhone device, exemplary code is a follows:

```
//-----------> PUSH NOTIFICATION <----------------------------
[sharedApplication registerForRemoteNotificationTypes:
    (UIRemoteNotificationTypeBadge |
    UIRemoteNotificationTypeSound |
UIRemoteNotificationTypeAlert)];
    [self enableNetworkNotification];
    self.window = [[UIWindow alloc] initWithFrame:[[UIScreen mainScreen] bounds]];
//      // Override point for customization after application launch.
//      if(IS_OS_7_OR_LATER){
```

```
//         self.window.backgroundColor = PING4_BLUE;
//         self.window.tintColor = [ThemeDecorator tintColor];
//     } else {
//         self.window.backgroundColor = [UIColor whiteColor];
//     }
    [self.window makeKeyAndVisible];
    isFirstWaveMode =YES;
    isFirstTimeRunning=YES;
    self.dbUtils = [[FMDBUtils alloc]
    initWithDatabase:@"Deals.sqlite"];
    [AppSettings SetSearchAlertArea:@"25 Mi"];
    [self initalize];
    [PingDatabaseManager PerFormDataBaseMaintance];
    [self loadViews];
    [self initAudioSession];
    if(![AppSettings getRegisteredDate]){
        [self showSplash];
    }
    [[NSNotificationCenter defaultCenter] addObserver:self
            selector:@selector(moreInfoBackClicked)
                name:@"moreInfoBackClicked" object:nil];
    [[NSNotificationCenter defaultCenter] addObserver:[self
    pingController]
            selector: @selector(getApp)
                name: @"App"
                object: self];
    if ([Utils getDefaults:@"v5databaseUpgrade"] == nil){
        [PingDatabaseManager v5databaseUpgrade];
        [Utils setDefault:@"upgraded"
                forKey:@"v5databaseUpgrade"];
    }
    [self handleNewNotifications];
    return YES;
}
```

In step 102, FIG. 6 server 10 is updated with current location information for the mobile device 16, FIG. 1 via server code examples of which are reproduced here:

```
--- MAIN CODE
local push_token = parse_push_token(ngx.var.the_update)
local mr_id = lookup_mrid(push_token)
ngx.log(ngx.DEBUG, "Push token is: " .. push_token)
ngx.log(ngx.DEBUG, "MRID: " .. mr_id)
local alert_keys = { }
local response = { }
alert_keys = fetch_notifications(mr_id)
ngx.log(ngx.DEBUG, "ALERT_KEYS: " .. alert_keys)
create_header(ngx.var.binary_remote_addr, #alert_keys, response)
output_binaries(alert_keys, response)
move_sent_alerts(alert_keys, mr_id)
response_to_send = table.concat(response, "")
function fetch_notifications(token)
    -- fetch the alert uuids, four results are returned from redis
    local reply = ngx.location.capture("/fetch_alerts",
                        {args = {token = token}})
    local replies = parser.parse_replies(reply.body, 5)
    local alert_keys = { }
    for i, result in ipairs(replies) do
        if i > 1 then -- ignore the first result as it comes from the
        select 2 call
            local res = result[1]
            local typ = result[2]
            -- update the alert keys tables
            for j, notification in ipairs(res) do
                table.insert(alert_keys, notification)
            end
        end
    end
    return alert_keys
end
```

In step 104, FIG. 6, the alert application 14, FIG. 1 receives new alerts via code such as set forth here for an Android device:

```
public static synchronized void requestNewAlerts(Context context, double distance, int pushRecordID, String classification, String alert_type) {
    context = context.getApplicationContext( );
    // Since GlobalState is in memory it's possible that it can get reset if the app is restarted. In that case
    // we will need to re-register with Google. However; if we already have a registration id stored in the
    // shared preferences then we can still continue.
    if (((GlobalState) context).isInitialized( )) {
        if (locationServicesEnabled(context)) {
            URLEncode urlEncode = new URLEncode( );
            byte[ ] response = null;
            try {
                // Read the preferences to see if they wish to override the value we got from the device
                float prefLat = Ping4Alerts.getUserLatitude(context);
                float prefLng = Ping4Alerts.getUserLongitude(context);
                if (prefLat == 0.0 && prefLng == 0.0) {
                    // We don't have a location. So tell the LocationTrackerService to reset the location monitoring.
                    // This way well get an update on the next go around
                    log.error("No latitude or longitude stored requesting current location [" + ++num_zero_location + "]");
                    LocationTrackerService.restartLocationMonitoring( );
                    return;
                }
                // At this point we should have our location either the current one or the last one.
                String registration_id = Globals.getRegistrationId(context);
                if (registration_id != null) {
                    // Make sure we don't request alerts if we don't have a device token
                    String strURL = urlEncode.getEncodedVNSQURL(context, CategoryList.C_Category, prefLng, prefLat, distance, null);
                    try {
                        if (strURL != null) {
                            URL url = new URL(strURL);
                            long t1 = new Date( ).getTime( );
                            response = DataProcess.getURLResponseByte(url, context);
                            Ping4Alerts.lastUpdateTime = new Date( ).getTime( );
```

-continued

```
                                        log.info("Request for alerts processed in " + (Ping4Alerts.lastUpdateTime – t1)
+ " milliseconds");
                                }
                        } catch (IOException e) {
                                log.error("timerRead( ) exception:", e);
                                // Network error. Create a notification
                        }
                        @SuppressWarnings("unused")
                        boolean dbChanged = DataProcess.DecodeVNSQData(response, context,
    distance, pushRecordID, classification, alert_type);
                                // Refresh the alerts and deals view
                                Intent intent = new Intent("refresh-alerts-view");
                                LocalBroadcastManager.getInstance(context).sendBroadcast(intent);
                        } else {
                                log.error("Expected to request new alerts but registration_id is not set in
Globals.");
                                log.info("Start registration process for C2DM--- again");
                                Intent intent = new Intent("com.google.android.c2dm.intent.REGISTER");
                                intent.putExtra("app",
PendingIntent.getBroadcast(context.getApplicationContext( ), 0, new Intent( ), 0));
                                intent.putExtra("sender", "Ping4Alerts@gmail.com");
                                context.getApplicationContext( ).startService(intent);
                        }
                } catch (NoLocationInformation e) {
                        log.error("Error requesting new alerts", e);
                }
        } else {
                log.error("There are no location services enabled.");
        }
} else {
        if( Globals.getRegistrationId(context.getApplicationContext( )) == null ){
                log.info("Request alerts called but app is not initialized so lets initialize it again.");
                // We need to re-initialize here somehow?
                MainActivity.regregisterApp(context.getApplicationContext( ));
        } else {
                log.info("Seems like we were restarted but we do have a registration id so let's mark
the app as initialized.");
                ((GlobalState)context.getApplicationContext( )).setInitialized(true);
        }
    }
}
``` iPhone device code may be used as follows:

```
// This is for iOS 7 to support background fetch mode. This will be called by the OS
periodically for the app to
// perform a background retrival of alerts. The app has up to 30 seconds to complete this
action.
-(void)application:(UIApplication *)application
performFetchWithCompletionHandler:(void
(^)(UIBackgroundFetchResult))completionHandler
{
        // Only get the users location if they are not currently in a region that's being monitored
        ScheduledLocationManager* locMgr = [ScheduledLocationManager
sharedScheduledLocationManager];
        if( ![locMgr regionEstablished])
        {
                DDLogInfo(@"region monitoring is not setup so force getting the users location");
                [locMgr getUserLocationWithInterval:50];
        }
        CLLocation* currentLocation = [ScheduledLocationManager
sharedScheduledLocationManager].lastLocation;
        // If there is no location yet then don't even look for alerts
        if( currentLocation == nil || (currentLocation.coordinate.latitude = 0.0 &&
currentLocation.coordinate.longitude == 0.0)){
                DDLogInfo(@"Not performing background check because we do not have a
location");
                completionHandler(UIBackgroundFetchResultNoData);
        } else {
                // Perform a !!a here
                DDLogInfo(@"performFetchWithCompletionHandler: getting alerts for location
 (%0.5f, %0.5f)", currentLocation.coordinate.latitude,
currentLocation.coordinate.longitude);
                [self askServerForAlertsAtLocation:currentLocation completionHandler:^(BOOL
    hadAlerts, BOOL scheduledLookup){
                        if( scheduledLookup )
```

```
                {
                        [self addLocation:currentLocation asLock:NO withAlerts:had Alerts];
                        if( hadAlerts ) {
                                completionHandler(UIBackgroundFetchResultNewData);
                        } else {
                                completionHandler(UIBackgroundFetchResultNoData);
                        }
                }
        }];
    }
}
-(void) askServerForAlertsAtLocation:(CLLocation*)aLocationcompletionHandler:(void
        (^)(BOOL hadAlerts, BOOL scheduledLookup ))handler {
//      if (!self.inBackgroundLookup){
                if (YES){
                        DDLogInfo(@"askServerForAlertsAtLocation: [%0.5f, %0.5f]",
        aLocation.coordinate.latitude, aLocation.coordinate.longitude);
                        NSDate *now = [NSDate date];
                        // We are going to schedule a task scheduleDelay seconds in the future. So if we
        come through this code again
                        // before that taks has run then inBackgroundLookup will be still true so we will not
        execute this.
                        int scheduleDelay = 2;
                        NSDate *scheduled = [now dateByAddingTimeInterval:2] ;
                        NSCalendar *calendar = [NSCalendar currentCalendar];
                        unsigned int unitFlags =
        NSYearCalendarUnit|NSMonthCalendarUnit|NSDayCalendarUnit|NSHourCalendarUnit|
        NSMinuteCalendarUnit;
                        NSDateComponents *comp = [calendar components:unitFlags fromDate:scheduled];
                        ToDoItem *todoitem = [[ToDoItem alloc] init];
                        todoitem.dateComponents = comp;
                        todoitem.eventName = @"New Alerts ping4alerts!";
                        todoitem.isLocationChange =YES;
                        self.inBackgroundLookup = YES;
                        //[[LocationServicesManagersharedLocationServicesManager]
        logEnergyUsagewithLockAchieved:NO];
                        [self scheduleNotificationWithItem:todoitem atLocation:aLocation
        completionHandler: (BOOL hadAlerts){
                                self.inBackgroundLookup = NO;
                                handler(hadAlerts, YES);
                        }];
                } else {
                        DDLogInfo(@"askServerForAlertsAtLocation: already processing background
        request");
                        handler(NO, NO);
                }
        }
```

Figure 7:
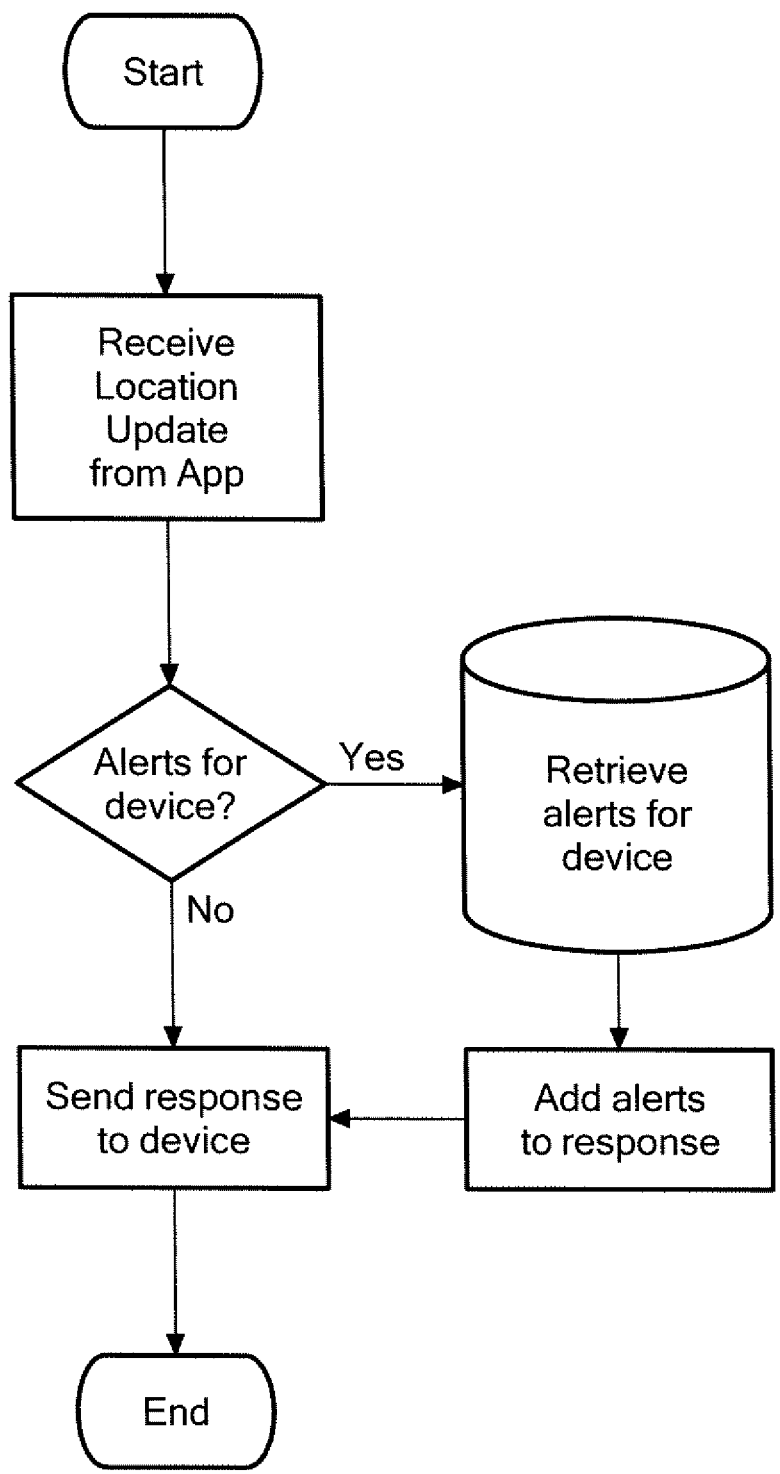
FIG. 7 is a flow chart depicting the primary steps associated with an algorithm of the alert server for receiving location information updates from an alert application and searching for alerts for specific user devices, and sending alerts to the user mobile device alert application.
Figure 8:
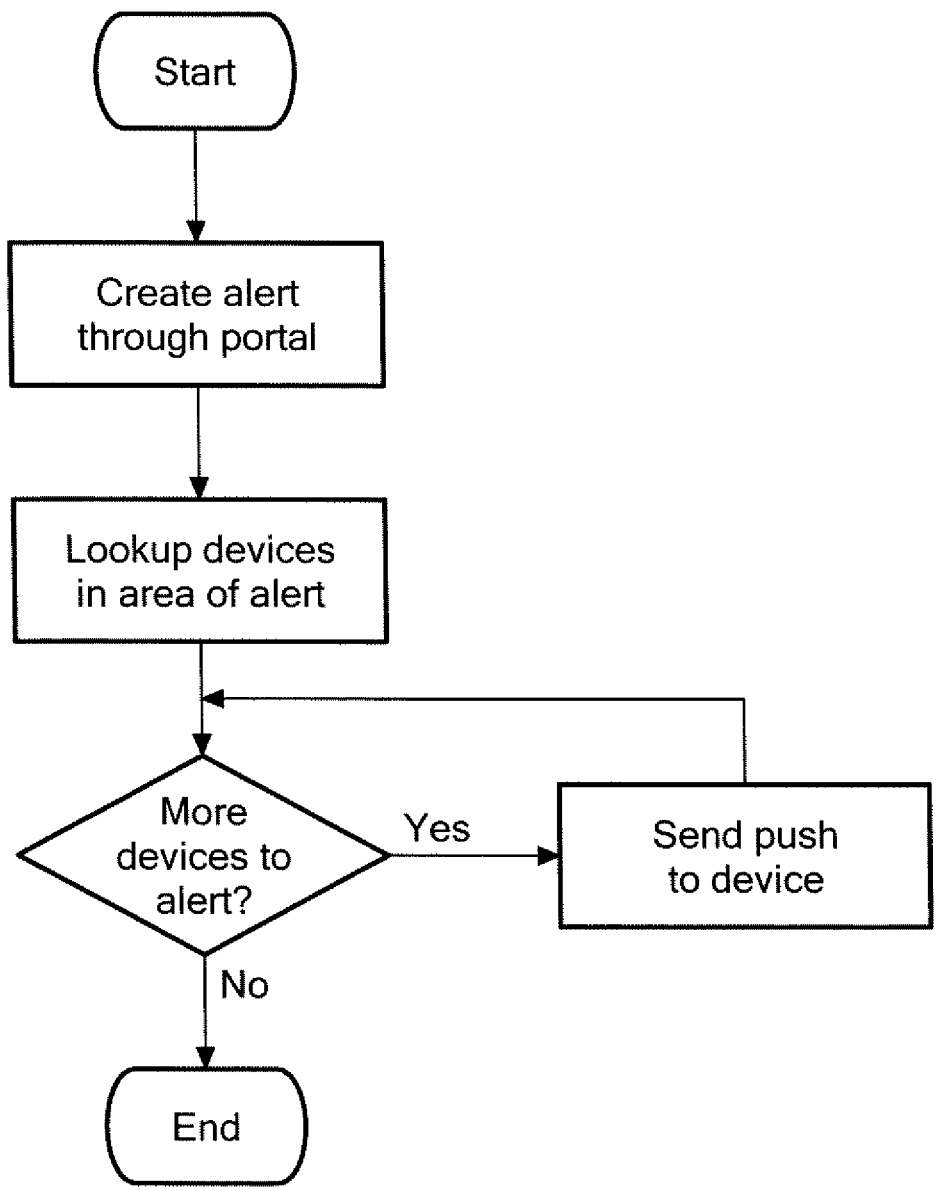
FIG. 8 is a flow chart depicting the primary steps associated with an algorithm associated with the alert server for receiving alerts and sending alerts to user devices.

An example of an algorithm for server 10, FIG. 1 enabling matching alert location information to user device locations is set forth in FIG. 7. In FIG. 8, an alert is pushed to a device application via code such as that reproduced here:

```
def execute
    StatsD.measure("push.upload_assets") do
        notification.upload_assets
    end
    start = Time.now
    Rails.logger.info "**********BEGINNING PUSH for alert #{notification.id}**********"
    Rails.logger.info "**********started at #{start}**********"
    StatsD.measure("push.queue_all_new_alert") do
        Rails.logger.error("Pushing alert #{notification.id} after it is no longer valid") unless notification.schedulable?
        notification.mobile_registrations.minimal_fields.includes(:alert_preferences).select(alert_preferences: [:settings, :mobile_registration_id]).find_in_batches(:batch_size => batch_size) do |mobile_reg_batch|
            queue_and_push mobile_reg_batch
        end
    end
    finish = Time.now
    Rails.logger.info "**********END PUSH for alert #{notification.id}**********"
    Rails.logger.info "**********started at #{start}, ended at #{finish}, elapsed time #{finish - start}**********"
    mark_pushed
    self
end
# queue up notification per user, and push to phone (if desired)
```

```
def queue_and_push(registrations)
    Rails.logger.info "PushAlertContext: fetching registrations alert_id #{notification.id}"
    StatsD.measure("push.fetch_registrations") do
        registrations = registrations.to_a
    end
    StatsD.increment('push.registrations', registrations.count)
    Rails.logger.info "PushAlertContext: queuing alert_id #{notification.id}"
    StatsD.measure("push.populate_relevant")do
        RelevantNotificationSet.mark_alerts_as_queued(registrations, notification)
    end
    if push_to_phone?
        Rails.logger.info "PushAlertContext: pushing alert #{notification.id}"
        StatsD.measure("push.schedule_push")do
            schedule_push(registrations, notification)
        end
        Rails.logger.info "PushAlertContext: pushed alerts alert #{notification.id}"
    else
        Rails.logger.info "PushAlertContext: not pushing alert #{notification.id}"
    end
        end
```

Figure 9:
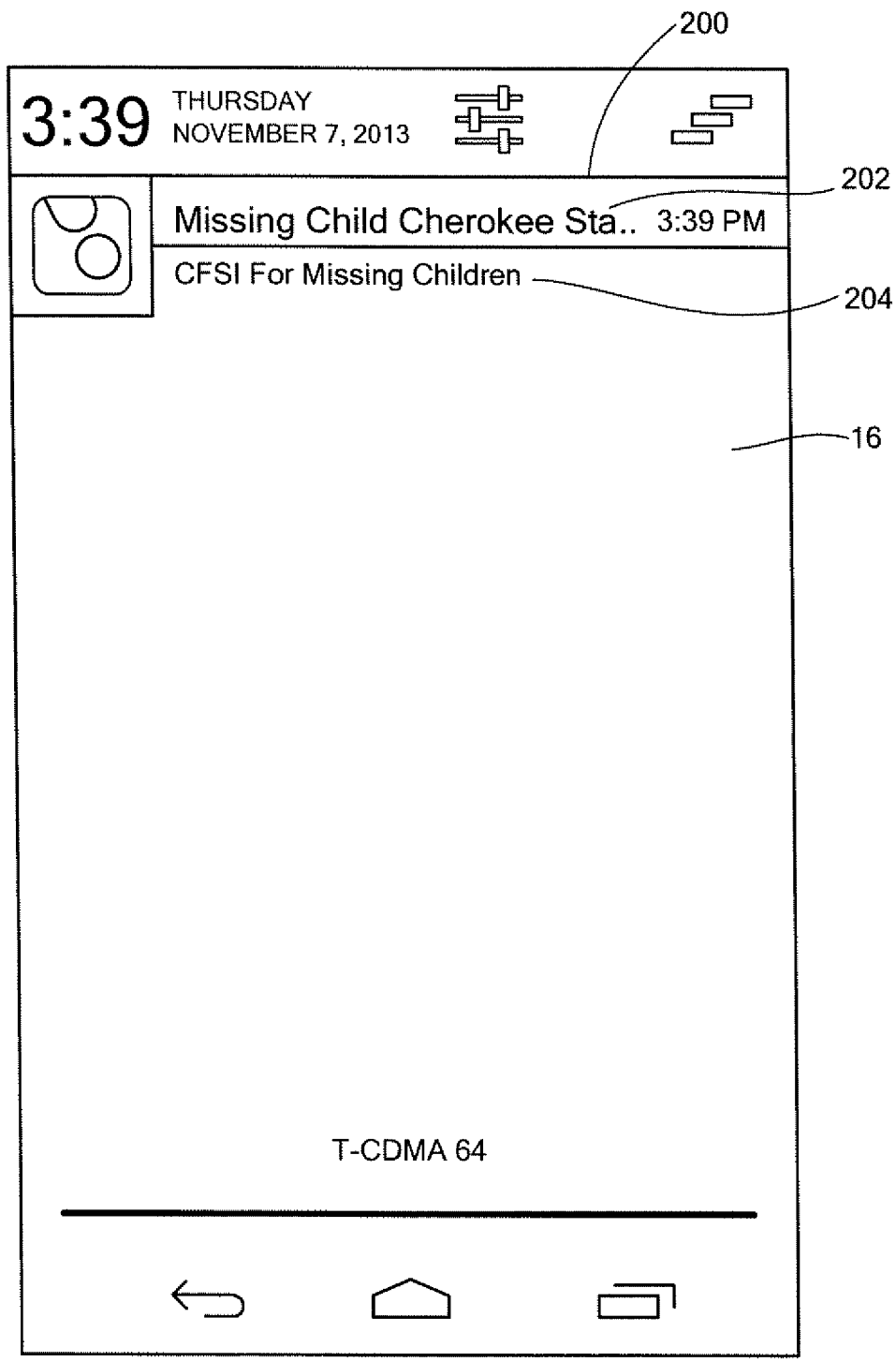
FIG. 9 is a view of a screen display for the user mobile device of FIG. 1 showing a received alert notification.

FIG. 9 shows a device 16 with a screen showing alert notification 200 including alert title 202 and alert originator 204.

Figure 10:
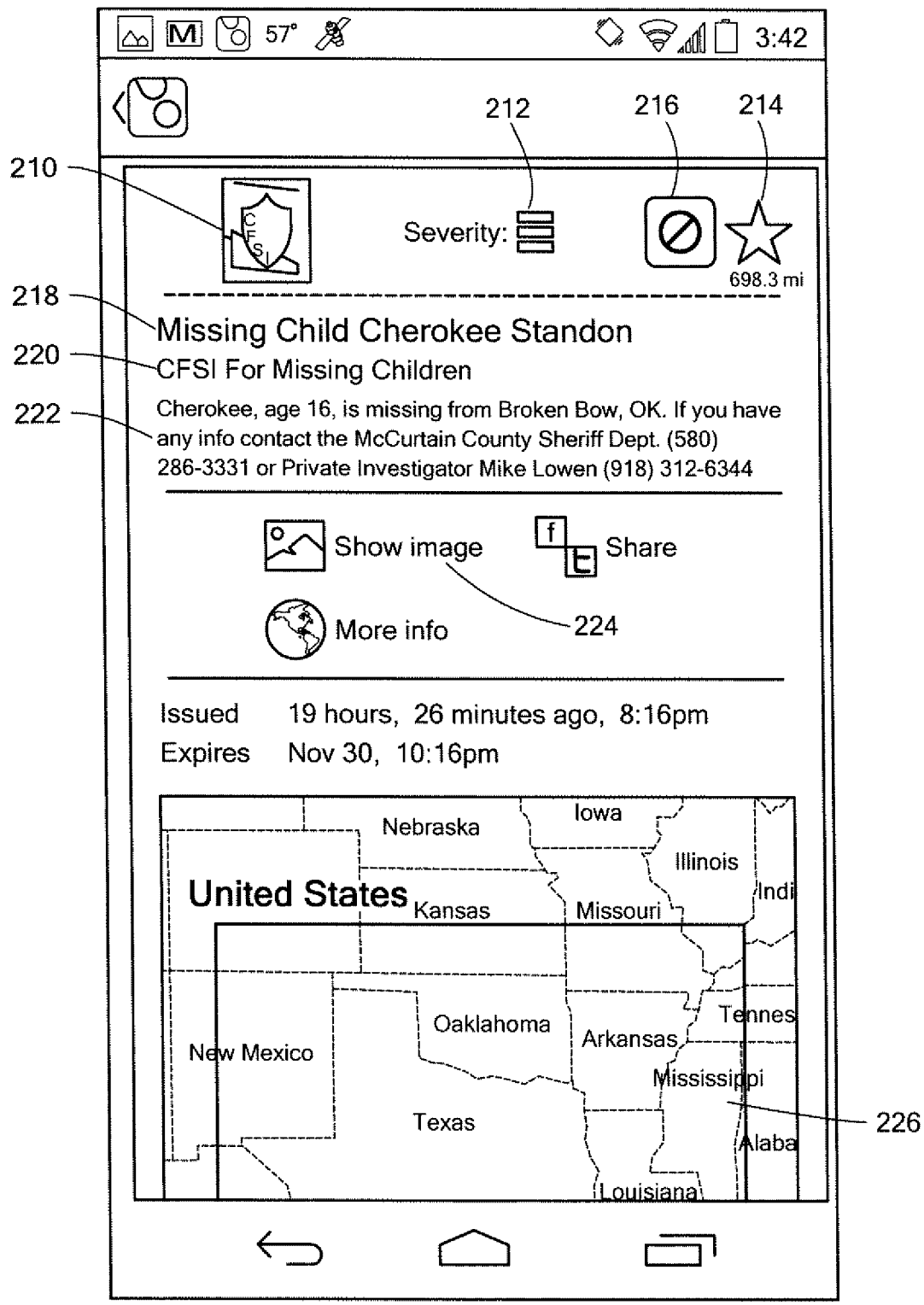
FIG. 10 is a view of a screen display of a user mobile device showing alert information downloaded to the mobile device.

When full alert information is requested, it appears on the user device as shown in the example of FIG. 10 where the originator information and/or logo is at 210 and an alert severity level is shown at 212. The user can mark an alert as a favorite as shown at 214 or block alerts from this particular originator as shown at 216. The alert title is shown at 218 the alert sender information is shown at 220. The body of the alert at 222 includes the alert information and links are available as shown at 224 for links to more rich media. The alert geofence is shown at 226.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An alert system comprising:
a web based alert server configured with an alert creation portal allowing a customer to generate and store an alert specific to a location; and
an alert application for mobile devices configured to upload to the alert server an anonymous token and mobile device location information for each mobile device;
the alert server further configured to:
search for anonymous tokens for mobile devices located within the alert location, and
serve a stored alert to the alert applications of said mobile devices located within the alert location,
wherein the alert server is configured to forward the anonymous tokens for mobile devices located within the alert location and an alert identifier to a location service which transmits an alert identifier to the alert applications of said mobile devices, and
wherein the alert server is configured to populate, update, and search a first data base including anonymous tokens corresponding to mobile device location information and to populate, update, and search an alert data base including alert identifiers corresponding to alert information.

2. The system of claim 1 in which the alert application is configured to register with a location service which assigns an anonymous token to the alert application of each mobile device.

3. The system of claim 2 in which the alert application is further configured to receive location information.

4. The system of claim 3 in which the alert application is further configured to upload said anonymous token and mobile device location information to the alert server.

5. The system of claim 1 in which the alert application is further configured to allow a user of the mobile device to request alert information from the alert server.

6. The system of claim 5 in which the alert server is configured, in response to a said request, to serve the alert application with alert information corresponding to the alert identifier.

7. A mobile device alert system comprising:
a web based alert server;
a location service configured to assign an anonymous token for each mobile device;
a downloadable alert application for each said mobile device configured to
transmit said anonymous token and location information to the web based alert server, and
request alert information in response to a received alert identifier;
the web based alert server configured:
with an alert creation portal allowing a customer to generate and store an alert specific to an alert location, to store location data for said mobile devices represented by said anonymous tokens, to search for anonymous tokens representing mobile devices located within an alert location, and to serve a stored alert to the alert applications of said mobile devices located within the alert location, wherein the web based alert server is configured to transmit an alert identifier and tokens representing mobile devices located within an alert location to the location service which is configured to transmit the alert identifier to mobile devices represented by the tokens.

8. The system of claim 7 in which the downloadable alert application is further configured to allow a user of the mobile device to request alert information from the alert server.

9. The system of claim 7 in which the alert server is configured, in response to a said request, to serve the alert application with alert information corresponding to the alert identifier.

10. An alert method comprising:
allowing a customer to generate and store alert information specific to an alert location;
keeping track of the location of mobile devices each represented by an anonymous token;
searching for anonymous tokens representing mobile devices located within a stored alert location;
receiving a request for an alert information from a mobile device; and
serving stored alert information to mobile devices located within the alert location, wherein serving a stored alert includes forwarding anonymous tokens representing mobile devices located within the alert location and a corresponding alert identifier to a location service which transmits the alert identifier to an alert application of said mobile devices.

11. The method of claim 10 further including the step of assigning an anonymous token to each mobile device.

12. An alert method comprising:
allowing a customer to generate and store alert information specific to an alert location represented by an alert identifier;
downloading an alert application to a user mobile device;
requesting, via the alert application, alert information from an alert server;
assigning to said mobile device an anonymous token;
transmitting said anonymous token and mobile device location information to an alert server;
searching for anonymous tokens for mobile devices located within the alert location;
serving an alert identifier to the location service along with the anonymous tokens for mobile devices located within the alert location; and
forwarding the alert identifier to the alert applications of user mobile devices having a matching anonymous token, the alert information corresponding to the alert identifier.

\* \* \* \* \*